United States Patent
SayyarRodsari et al.

(10) Patent No.: US 12,165,302 B2
(45) Date of Patent: Dec. 10, 2024

(54) AUTOMATED MONITORING USING IMAGE ANALYSIS

(71) Applicant: Rockwell Automation Technologies, Inc., Mayfield Heights, OH (US)

(72) Inventors: Bijan SayyarRodsari, Austin, TX (US); Wei Dai, Austin, TX (US); Alexander N. Berman, Austin, TX (US); Kadir Liano, Pflugerville, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 576 days.

(21) Appl. No.: 17/482,040

(22) Filed: Sep. 22, 2021

(65) Prior Publication Data
US 2023/0092247 A1    Mar. 23, 2023

(51) Int. Cl.
*G06T 7/00* (2017.01)
*G05B 19/4155* (2006.01)
(Continued)

(52) U.S. Cl.
CPC ........ *G06T 7/0004* (2013.01); *G05B 19/4155* (2013.01); *G05B 19/41875* (2013.01);
(Continued)

(58) Field of Classification Search
CPC ......... G06T 7/0004; G06T 2207/20081; G06T 2207/20084; G06T 2207/30108;
(Continued)

(56) References Cited

U.S. PATENT DOCUMENTS

2017/0290541 A1* 10/2017 Albers ................ A61B 5/4082
2021/0255839 A1* 8/2021 Von Niederhausern .....................
                                                        G06F 9/5077
(Continued)

FOREIGN PATENT DOCUMENTS

WO    2021050285 A1    3/2021

OTHER PUBLICATIONS

Wienert, S., Heim, D., Kotani, M et al. [online] CognitionMaster: an object-based image analysis framework. Diagn Pathol 8, 34 (2013). retrieved from https://doi.org/10.1186/1746-1596-8-34 (Year: 2013).*
(Continued)

*Primary Examiner* — Charles Cai
(74) *Attorney, Agent, or Firm* — Fletcher Yoder, P.C.

(57) ABSTRACT

A non-transitory computer-readable medium comprising computer-executable instructions that, when executed, are configured to cause a processor to perform operations that include receiving image data after an operation is performed by an industrial automation device on a product; analyzing the image data based an object-based image analysis (OBIA) model to classify the product as one of a plurality of conditions related to manufacturing quality and the OBIA model includes property layers associated with features related to a manufacturing of the product; determining whether the one of the conditions indicates an anomaly being present in the product; sending a notification indicative of the one of the plurality of conditions is presently associated with the product; identifying a property layer associated with classifying the one of the plurality of conditions; and updating the OBIA model based on the property layer and the input indicative of the anomaly being incorrectly associated with the product.

17 Claims, 6 Drawing Sheets

(51) Int. Cl.
  G05B 19/418  (2006.01)
  G06F 18/21  (2023.01)
  G06F 18/2431  (2023.01)
  G06N 20/00  (2019.01)

(52) U.S. Cl.
  CPC ........ *G06F 18/217* (2023.01); *G06F 18/2431* (2023.01); *G06N 20/00* (2019.01); *G05B 2219/31229* (2013.01); *G05B 2219/32368* (2013.01); *G06T 2207/20081* (2013.01); *G06V 2201/06* (2022.01)

(58) Field of Classification Search
  CPC .............. G06T 1/0014; G05B 19/4155; G05B 19/41875; G05B 2219/31229; G05B 2219/32368; G05B 2219/32193; G06F 18/217; G06F 18/2431; G06N 20/00; G06N 3/09; G06N 3/045; G06N 3/082; G06V 2201/06
  See application file for complete search history.

(56) References Cited

U.S. PATENT DOCUMENTS

| | | | |
|---|---|---|---|
| 2022/0189002 A1* | 6/2022 | Kim | G06F 18/217 |
| 2024/0071059 A1* | 2/2024 | Schreiner | G06V 10/778 |

OTHER PUBLICATIONS

Arthur Douillard, "Learning Deep Neural Networks Incrementally", Dec. 10, 2019, 14 pages, https://medium.com/heuritech/learning-deep-neural-networks-incrementally-3e005e4fb4bc.

Chao Ma, Jia-Bin Huang, Xiaokang Yang, and Ming-Hsuan Yang, "Robust Visual Tracking via Hierarchical Convolutional Features", Aug. 11, 2018, 14 pages, https://arxiv.org/abs/1707.03816.

Ge Liu, Haoyang Zeng and David K. Gifford, "Visualizing Complex Feature Interactions and Feature Sharing In Genomic Deep Neural Networks", Jul. 19, 2019, 14 pages, https://bmcbioinformatics.biomedcentral.com/articles/10.1186/s12859-019-2957-4.

Adrian Rosebrock, "Online learning with Keras and Crème", Jun. 17, 2019, 44 pages, https://www.byimagesearch.com/2019/06/17/online-incremental-learning-with-keras-and-creme/.

Jason Brownlee, "How to Visualize Filters and Feature Maps in Convolutional Neural Networks", May 6, 2019, 59 pages, https://machinelearningmastery.com/how-to-visualize-filters-and-feature-maps-in-convolutional-neural-networks/.

Kim, Tae-Hyun, Hye-Rin Kim, and Yeong-Jun Cho. "Product inspection methodology via deep learning: An Overview." Sensors 21.15 (2021): 5039. <online>, retrieved at <https://www.mdpi.com/1424-8220/21/15/5039>.

Zhao Yue Zhaoyue@Iie Ac Cn et al: "AI-Lancet: Locating Error-inducing Neurons to Optimize Neural Networks", Proceedings of the 32nd Conference on L'Interaction Homme-Machine, ACMPUB27, New York, NY, USA, Nov. 12, 2021 (Nov. 12, 2021), pp. 141-158, XP058942392, DOI: 10.1145/3460120.3484818 ISBN: 978-1-4503-8607-4 * section 1 *.

* cited by examiner

AUTOMATED MONITORING USING IMAGE ANALYSIS

BACKGROUND

The present disclosure generally relates to control systems and, more particularly, to control systems using image data for monitoring, diagnostics, control, and optimization of processes.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also facilitate performing diagnostics on the process to determine a cause of undesired operation.

In some instances, the control system may utilize a model predictive control (MPC) system to optimize performance of the process by generating and manipulating a process model to transition the process from a current operating state to a desired operating state over a control horizon (e.g., future time steps). However, training the process model may prove to involve an inefficient use of computing resources (e.g., energy, processing power, storage). As such, it may be desirable to provide improved systems and methods for training and retraining the process model in real time or near real time to increase the efficiency in which the industrial automation system operates.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a non-transitory computer-readable medium comprising computer-executable instructions that, when executed, are configured to cause a processor to perform operations comprising receiving image data after one or more operations are performed by one or more industrial automation devices on a product. The operations also include analyzing the image data based an object-based image analysis (OBIA) model to classify the product as one of a plurality of conditions related to manufacturing quality, wherein the OBIA model comprises one or more property layers associated with one or more features related to a manufacturing of the product. Further, the operation include determining whether the one of the plurality of conditions is indicative of an anomaly being present in the product. Further still, the operations include sending a notification to a computing device, wherein the notification is indicative of the one of the plurality of conditions is presently associated with the product. Even further, the operations includes identifying at least one property layer of the one or more property layers of the OBIA model associated with classifying the one of the plurality of conditions in response to receiving an input indicative of the anomaly being incorrectly associated with the product. Even further, the operations include updating the OBIA model based on the at least one property layer of the one or more property layers and the input indicative of the anomaly being incorrectly associated with the product.

In another embodiment, the present disclosure relates to a method. The method may include receiving, via a processor, image data after one or more operations are performed by one or more industrial automation devices on a product. The method may also include analyzing, via the processor, the image data based an object-based image analysis (OBIA) model to classify the product as one of a plurality of conditions related to manufacturing quality, wherein the OBIA model comprises one or more property layers associated with one or more features related to a manufacturing of the product. Further, the method may include determining, via the processor, whether the one of the plurality of conditions is indicative of an anomaly being present in the product. Further, the method may include sending, via the processor, a notification to a computing device, wherein the notification is indicative of the one of the plurality of conditions is presently associated with the product. Even further, the method may include identifying, via the processor, at least one property layer of the one or more property layers of the OBIA model associated with classifying the one of the plurality of conditions in response to receiving an input indicative of the anomaly being incorrectly associated with the product. Further still, the method may include updating, via the processor, the OBIA model based on the at least one property layer of the one or more property layers and the input indicative of the anomaly being incorrectly associated with the product.

In another embodiment, the present disclosure relates to a non-transitory computer-readable medium comprising computer-executable instructions that, when executed, are configured to cause a processor to perform operations comprising receiving image data after one or more operations are performed by one or more industrial automation devices on a product. The operations also include analyzing the image data based an object-based image analysis (OBIA) model to classify the product as one of a plurality of conditions related to manufacturing quality, wherein the OBIA model comprises one or more property layers associated with one or more features related to a manufacturing of the product. Further, the operations include determining whether the one of the plurality of conditions is indicative of an anomaly being present in the product. Further, the operations include sending a notification to a computing device, wherein the notification is indicative of the one of the plurality of conditions is presently associated with the product. Even further, the operations include identifying at least one property layer of the one or more property layers of the OBIA model associated with classifying the one of the plurality of conditions in response to receiving an input indicative of the anomaly being incorrectly associated with the product. Further still, the operations include updating the OBIA model based on the at least one property layer of the one or more property layers and the input indicative of the anomaly being incorrectly associated with the product.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An object-based image analysis (OBIA) model may provide information regarding an operation condition of a product produced by an industrial automation process. In general, the OBIA model segments received image data and classifies the received image data based on the segmented image data. More specifically, the OBIA model may include multiple property layers for performing one or more operations or algorithms on the received image data to segment the image data into a segmented image. Such segmentation methods include clustering-based segmentation techniques, boundary or threshold based segmentation, morphological based segmentation, and the like. In any case, OBIA model extracts features from the segmented image data and the extracted features are used to classify a product represented in an image. For example, an OBIA model employed in a factory or assembly line may be used to classify the condition of the product produced by the factory or assembly line using textures, colors, shapes, or sizes of regions of the product captured in the image and revealed through segmentation. As such, a user (e.g., an operator) may utilize the classified image to monitor operation of the factory (e.g., determine whether the factor is producing an expected product). At least in some instances, the OBIA model may output an unexpected (e.g., incorrect) classification. As referred to herein, "an unexpected classification" may refer to a classification of a condition that deviates from a classification indicative of the actual condition of the product.

At least in some instances, the control system may implement a control action that causes the industrial system to operate according to an operating state based on the OBIA model. For example, the OBIA model may be employed by an industrial system for monitoring conditions of components of the industrial system and/or products produced by the industrial system. To that end, the OBIA model may generally receive image data indicative of the products and/or components and identify objects within the image data that may inform a user (e.g., an operator) regarding certain control actions to be performed. At least in some instances, the OBIA model may output an anomalous or unexpected classification (e.g., an unexpected classification) that does not accurately reflect the condition. In these instances, the OBIA model may be retrained, which may limit or reduce the efficiency of implementing the OBIA model while monitoring the industrial automation process. That is, an unexpected classification may result in retraining of the entire OBIA model, which may be undesirable because the OBIA may not be available for classifications, and retraining of the decision may utilize resources that would be used for other operations.

Accordingly, the present disclosure is directed to systems and methods for training, implementing, and modifying an OBIA model being utilized in an industrial automation system. Aspects in accordance with the present disclosure may prevent and/or minimize retraining of the entire OBIA model, and thus improving the robustness of the OBIA model used to control the industrial process. Moreover, by retraining a portion of the OBIA model, devices having relatively lower processing capabilities may be used to retrain the portion of the OBIA model. In general, the OBIA model is modified incrementally based on an identified unexpected classification output (e.g., output classification) by the OBIA model. That is, an OBIA model may output a classification that is determined to be an unexpected classification based on input (e.g., provided by a user) indicating that the classification does not accurately characterize an actual classification of a product produced by the industrial automation system. Rather than retraining the entire OBIA model, a portion (e.g., one or more property layers used to segment an image that is ultimately used to identify a condition) of the OBIA model related to the unexpected classification may be retrained. At least in some instances, the OBIA model may be taken offline or prevented from providing outputs to control the industrial automation system while the OBIA model is being retrained. Accordingly, modifying or retraining an OBIA model incrementally, may improve the robustness of the OBIA model may reduce the amount of processing power of the control system that manages the retraining of the OBIA model, reduce the amount of time in which an updated OBIA model is available for use, and the like.

Figure 1:
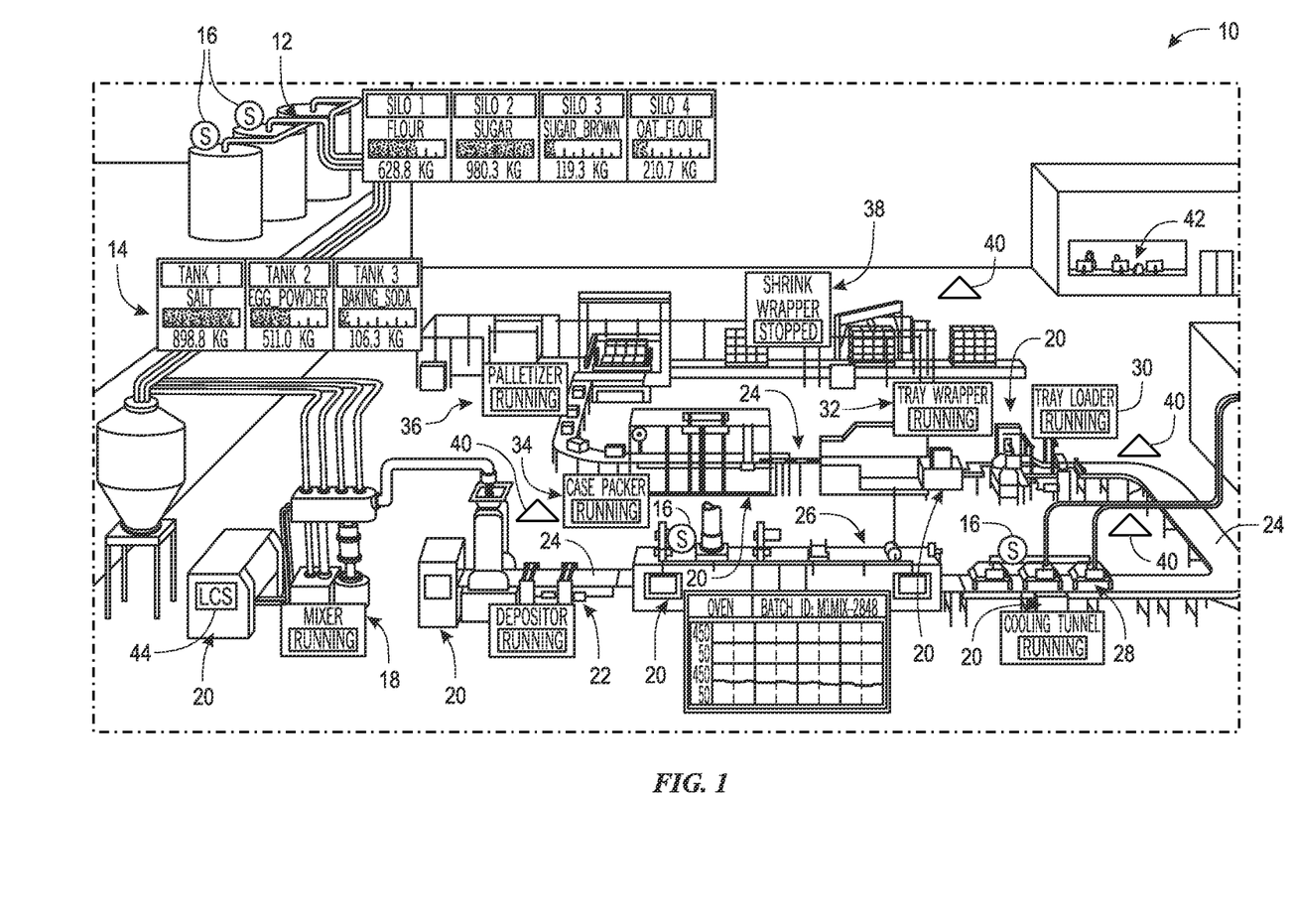
FIG. 1 illustrates an example industrial automation system employed by a food manufacturer, in accordance with an embodiment.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

The industrial automation system 10 may use image data received from image devices 40 to determine whether the components (e.g., the mixer 18, the depositor 22, the conveyor 24, the tray loader 30, the tray wrapper 32) of the industrial automation system 10 are performing their respective operations in an expected manner. For example, the image device 40 may be positioned proximate to the tray wrapper 32 such that the image device 40 may be capable of capturing images of the cooled material in the bag or the sealed bag. As such, the captured image may be analyzed (e.g., by a control system 42) or displayed on a computing device (e.g., a mobile phone, a laptop, a computer, a smart watch) of a user and may be utilized to inform certain decisions, such as whether to modify operation of the tray wrapper 32 to correct for an unexpected condition of the product (e.g., the sealed bag), such as the bag not being sealed entirely.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to the supervisory control system 42, and the like. In some embodiments, each industrial automation device 20 or a group of industrial automation devices 20 may be controlled using a control and monitoring system 44 (e.g., a local control system). The local control system 44 may receive data regarding the operation of the respective industrial automation device 20, other industrial automation devices 20, user inputs, and other suitable inputs to control the operations of the respective industrial automation device(s) 20.

Figure 2:
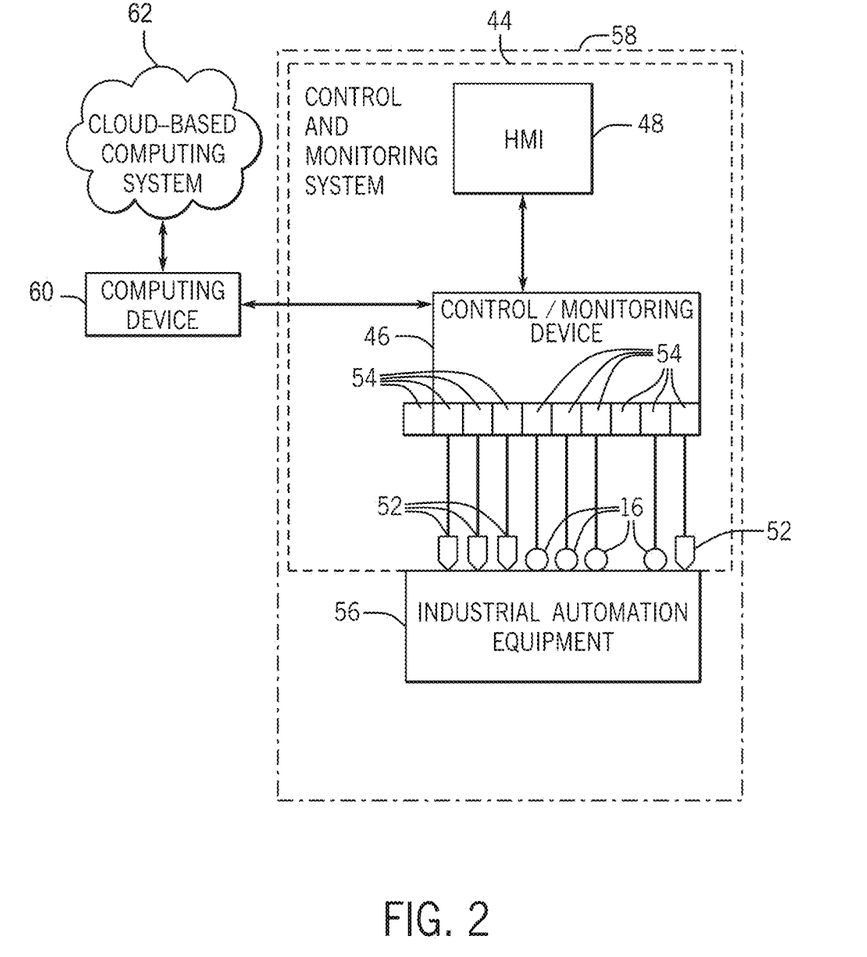
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary control and monitoring system 44 that may be employed in any suitable industrial automation system 10, in accordance with embodiments presented herein. In FIG. 2, the control and monitoring system 44 is illustrated as including a human machine interface (HMI) 48 and a control/monitoring device 46 or automation controller adapted to interface with devices that may monitor and control various types of industrial automation equipment 56. By way of example, the industrial automation equipment 56 may include the mixer 18, the depositor 22, the conveyor 24, the oven 26, other pieces of machinery described in FIG. 1, or any other suitable equipment.

It should be noted that the HMI 48 and the control/monitoring device 50, in accordance with embodiments of the present techniques, may be facilitated by the use of certain network strategies. Indeed, any suitable industry standard network or network may be employed, such as DeviceNet, to enable data transfer. Such networks permit the exchange of data in accordance with a predefined protocol and may provide power for operation of networked elements.

As discussed above, the industrial automation equipment 56 may take many forms and include devices for accomplishing many different and varied purposes. For example, the industrial automation equipment 56 may include machinery used to perform various operations in a compressor station, an oil refinery, a batch operation for making food items, a mechanized assembly line, and so forth. Accordingly, the industrial automation equipment 56 may comprise a variety of operational components, such as electric motors, valves, actuators, temperature elements, pressure sensors, or a myriad of machinery or devices used for manufacturing, processing, material handling, and other applications.

Additionally, the industrial automation equipment 56 may include various types of equipment that may be used to perform the various operations that may be part of an industrial application. For instance, the industrial automation equipment 56 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 56 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In certain embodiments, one or more properties of the industrial automation equipment 56 may be monitored and controlled by certain equipment for regulating control variables used to operate the industrial automation equipment 56. For example, the sensors 16 and actuators 52 may monitor various properties of the industrial automation equipment 56 and may provide data to the local control system 44, which may adjust operations of the industrial automation equipment 56, respectively.

In some cases, the industrial automation equipment 56 may be associated with devices used by other equipment. For instance, scanners, gauges, valves, flow meters, and the like may be disposed on industrial automation equipment 56. Here, the industrial automation equipment 50 may receive data from the associated devices and use the data to perform their respective operations more efficiently. For example, a controller (e.g., control/monitoring device 50) of a motor drive may receive data regarding a temperature of a connected motor and may adjust operations of the motor drive based on the data. As another non-limiting example, the control/monitoring device 50 of an assembly component may receive data regarding an abnormality in a product (e.g., a scratch, a wrinkle, an unpolished spot) and may adjust operations of assembly component to remove the abnormality from the product (e.g., buffing out a scratch, applying anew coat of paint, adjusting or stretching fabric to remove a wrinkle, replacing a portion of the product).

In certain embodiments, the industrial automation equipment 52 may include a communication component that enables the industrial equipment 52 to communicate data between each other and other devices. The communication component may include a network interface that may enable the industrial automation equipment 56 to communicate via various protocols such as Ethernet/IPC), ControlNet®, DeviceNet®, or any other industrial communication network protocol. Alternatively, the communication component may enable the industrial automation equipment 56 to communicate via various wired or wireless communication protocols, such as Wi-Fi, mobile telecommunications technology (e.g., 2G, 3G, 4G, LTE), Bluetooth®, near-field communications technology, and the like.

The image devices 40 may be any number of devices adapted to provide information regarding process conditions. The actuators 52 may include any number of devices adapted to perform a mechanical action in response to a signal from a controller (e.g., the control/monitoring device 46). The imaging devices 40 and actuators 52 may be utilized to operate the industrial automation equipment 56. Indeed, they may be utilized within process loops that are monitored and controlled by the control/monitoring device 46 and/or the HMI 46. Such a process loop may be activated based on process input data (e.g., input from a sensor 16) or direct operator input received through the HMI 46. As illustrated, the sensors 40 and actuators 52 are in communication with the control/monitoring device 46. Further, the sensors 16 and actuators 52 may be assigned a particular address in the control/monitoring device 46 and receive power from the control/monitoring device 46 or attached modules.

Input/output (I/O) modules 54 may be added or removed from the control and monitoring system 44 via expansion slots, bays or other suitable mechanisms. In certain embodiments, the I/O modules 54 may be included to add functionality to the control/monitoring device 46, or to accommodate additional process features. For instance, the I/O modules 54 may communicate with new sensors 16 or actuators 52 added to monitor and control the industrial automation equipment 56. It should be noted that the I/O modules 54 may communicate directly to sensors 16 or actuators 52 through hardwired connections or may communicate through wired or wireless sensor networks, such as Hart or IOLink.

Generally, the I/O modules 54 serve as an electrical interface to the control/monitoring device 46 and may be located proximate or remote from the control/monitoring device 46, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 54 may transfer input and output signals between the control/monitoring device 46 and the industrial automation equipment 56. As illustrated, the sensors 16 and actuators 52 may communicate with the control/monitoring device 46 via one or more of the I/O modules 54 coupled to the control/monitoring device 46.

In certain embodiments, the control/monitoring system 44 (e.g., the HMI 46, the control/monitoring device 46, the sensors 16, the actuators 52, the I/O modules 54) and the industrial automation equipment 56 may make up an industrial automation application 58. The industrial automation application 58 may involve any type of industrial process or system used to manufacture, produce, process, or package various types of items. For example, the industrial applications 58 may include industries such as material handling, packaging industries, manufacturing, processing, batch processing, the example industrial automation system 10 of FIG. 1, and the like.

In certain embodiments, the control/monitoring device 46 may be communicatively coupled to a computing device 60 and a cloud-based computing system 62. In this network, input and output signals generated from the control/monitoring device 46 may be communicated between the computing device 60 and the cloud-based computing system 62. Although the control/monitoring device 46 may be capable of communicating with the computing device 60 and the cloud-based computing system 62, as mentioned above, in certain embodiments, the control/monitoring device 46 (e.g., local computing system 42) may perform certain operations and analysis without sending data to the computing device 60 or the cloud-based computing system 62.

Figure 3:
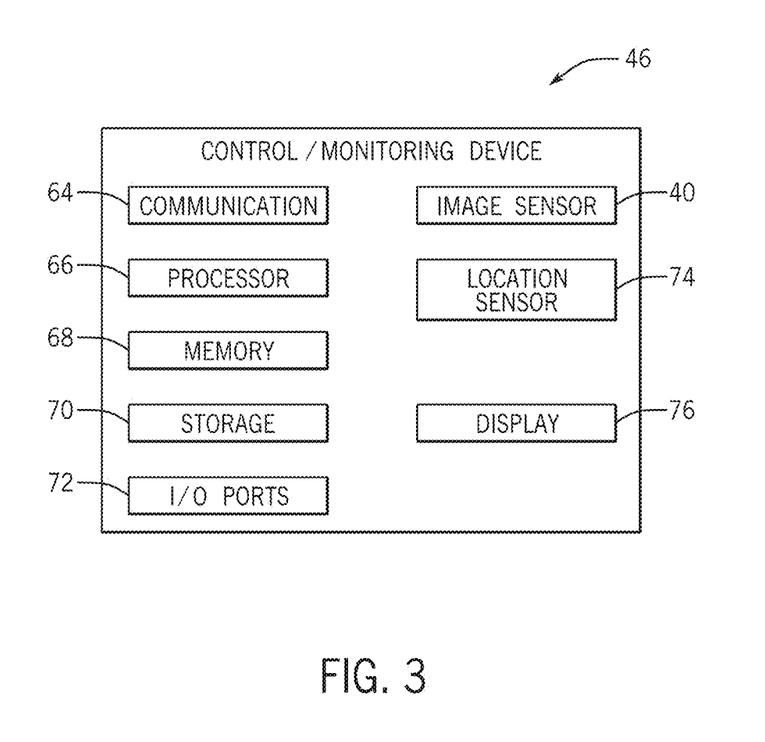
FIG. 3 illustrates example components that may be part of a control/monitoring device in a control system for the industrial automation system, in accordance with an embodiment.

In any case, FIG. 3 illustrates example components that may be part of the control/monitoring device 46, the local control system 44, or any other suitable computing device that implement embodiments presented herein. For example, the control/monitoring device 46 may include a communication component 64, a processor 66, a memory 68, a storage 70, input/output (I/O) ports 72, the imaging device 40 (e.g., a camera), a location sensor 74, a display 76, additional sensors (e.g., vibration sensors, temperature sensors), and the like. The communication component 64 may be a wireless or wired communication component that may facilitate communication between the industrial automation equipment 56, the cloud-based computing system 62, and other communication capable devices.

The processor 66 may be any type of computer processor or microprocessor capable of executing computer-executable code. The processor 66 may also include multiple processors that may perform the operations described below. The memory 68 and the storage 70 may be any suitable articles of manufacture that can serve as media to store processor-executable code, data, or the like. These articles of manufacture may represent computer-readable media (e.g., any suitable form of memory or storage) that may store the processor-executable code used by the processor 66 to perform the presently disclosed techniques. Generally, the processor 66 may execute software applications that include programs that enable a user to track and/or monitor operations of the industrial automation equipment 56 via a local or remote communication link. That is, the software applications may communicate with the control/monitoring device 46 and gather information associated with the industrial automation equipment 56 as determined by the control/monitoring device 46, via the sensors 16 disposed on the industrial automation equipment 56 and the like.

The memory 68 and the storage 70 may also be used to store the data, analysis of the data, the software applications, and the like. The memory 68 and the storage 70 may represent non-transitory computer-readable media (e.g., any suitable form of memory or storage) that may store the processor-executable code used by the processor 66 to perform various techniques described herein. It should be noted that non-transitory merely indicates that the media is tangible and not a signal.

In one embodiment, the memory 68 and/or storage 70 may include a software application that may be executed by the processor 66 and may be used to monitor, control, access, or view one of the industrial automation equipment 56. As such, the computing device 60 may communicatively couple to industrial automation equipment 56 or to a respective computing device of the industrial automation equipment 56 via a direct connection between the devices or via the cloud-based computing system 62. The software application may perform various functionalities, such as track statistics of the industrial automation equipment 56, store reasons for placing the industrial automation equipment 56 offline, determine reasons for placing the industrial automation equipment 56 offline, secure industrial automation equipment 56 that is offline, deny access to place an offline industrial automation equipment 56 back online until certain conditions are met, and so forth.

The I/O ports 72 may be interfaces that may couple to other peripheral components such as input devices (e.g., keyboard, mouse), sensors, input/output (I/O) modules, and the like. I/O modules may enable the computing device 60 or other control/monitoring devices 46 to communicate with the industrial automation equipment 56 or other devices in the industrial automation system via the I/O modules.

The image device 40 may include any image acquisition circuitry such as a digital camera capable of acquiring digital images, digital videos, or the like. The location sensor 74 may include circuitry designed to determine a physical location of the computing device 60. In one embodiment, the location sensor 74 may include a global positioning system (GPS) sensor that acquires GPS coordinates for the control/monitoring device 46.

The display 76 may depict visualizations associated with software or executable code being processed by the processor 66. In one embodiment, the display 76 may be a touch display capable of receiving inputs (e.g., parameter data for operating the industrial automation equipment 56) from a user of the control/monitoring device 46. As such, the display 76 may serve as a user interface to communicate with the industrial automation equipment 56. The display 76 may display a graphical user interface (GUI) for operating the industrial automation equipment 56, for tracking the maintenance of the industrial automation equipment 56, and the like. In some embodiments, the GUI may display an image of a product produced by the industrial automation system 10. The GUI may further provide labels of features identified in the product (e.g., identified using an OBIA model) and a classification of one or more conditions of the product. Further, the GUI may be enable a user to provide input related to the OBIA model, such as a relative ranking of features to utilize by the OBIA model when classifying the product, as described in more detail with respect to FIGS. 4-6. In any case, the display 76 may be any suitable type of display, such as a liquid crystal display (LCD), plasma display, or an organic light emitting diode (OLED) display, for example. Additionally, in one embodiment, the display 76 may be provided in conjunction with a touch-sensitive mechanism (e.g., a touch screen) that may function as part of a control interface for the industrial automation equipment 56 or for a number of pieces of industrial automation equipment 56 in the industrial automation application 58, to control the general operations of the industrial automation application 58. In some embodiments, the operator interface may be characterized as the HMI 48, a human-interface machine, or the like implemented via the display 76.

Although the components described above have been discussed with regard to the control/monitoring device 46 and the local control system 44, it should be noted that similar components may make up other computing devices described herein. Further, it should be noted that the listed components are provided as example components and the embodiments described herein are not to be limited to the components described with reference to FIG. 3.

Referring back to FIG. 2, in operation, the industrial automation application 58 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof.

To produce the one or more outputs used to control the industrial automation equipment 56, the control/monitoring device 46 may output control signals to instruct industrial automation equipment 56 to perform a control action by implementing manipulated variable set points. For example, the control/monitoring device 46 may instruct a motor (e.g., an automation device 20) to implement a control action by actuating at a particular operating speed (e.g., a manipulated variable set point).

In some embodiments, the control/monitoring device 46 may determine the manipulated variable set points based at least in part on process data. As described above, the process data may be indicative of operation of the industrial automation device 20, the industrial automation equipment 56, the industrial automation application 58, and the like. As such, the process data may include operational parameters of the industrial automation device 20 and/or operational parameters of the industrial automation application 58. For example, the operational parameters may include any suitable type, such as temperature, flow rate, electrical power, and the like.

Thus, the control/monitoring device 46 may receive process data from one or more of the industrial automation devices 20, the sensors 16, or the like. In some embodiments, the sensor 16 may determine an operational parameter and communicate a measurement signal indicating the operational parameter to the control/monitoring device 46. For example, a temperature sensor may measure temperature of a motor (e.g., an automation device 20) and transmit a measurement signal indicating the measured temperature to the control/monitoring device 46. The control/monitoring device 46 may then analyze the process data to monitor performance of the industrial automation application 58 (e.g., determine an expected operational state) and/or perform diagnostics on the industrial automation application 58.

To facilitate controlling operation and/or performing other functions, the control/monitoring device 46 may include one or more controllers, such as one or more model predictive control (MPC) controllers, one or more proportional-integral-derivative (PID) controllers, one or more neural network controllers, one or more fuzzy logic controllers, or any combination thereof.

In some embodiments, the supervisory control system 42 may provide centralized control over operation of the industrial automation application 58. For example, the supervisory control system 42 may enable centralized communication with a user (e.g., operator). To facilitate, the supervisory control system 42 may include the display 76 to facilitate providing information to the user. For example, the display 76 may display visual representations of information, such as process data, selected features, expected operational parameters, and/or relationships there between. Additionally, the supervisory control system 42 may include similar components as the control/monitoring device 46 described above in FIG. 3.

On the other hand, the control/monitoring device 46 may provide localized control over a portion of the industrial automation application 58. For example, in the depicted embodiment of FIG. 1, the local control system 44 that may be part of the mixer 18 may include the control/monitoring device 46, which may provide control over operation of a first automation device 20 that controls the mixer 18, while a second local control system 44 may provide control over operation of a second automation device 20 that controls the operation of the depositor 22.

In some embodiments, the local control system 44 may control operation of a portion of the industrial automation application 56 based at least in part on the control strategy determined by the supervisory control system 42. Additionally, the supervisory control system 40 may determine the control strategy based at least in part on process data determined by the local control system 44. Thus, to implement the control strategy, the supervisory control system 40 and the local control systems 44 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

As discussed above, the industrial automation system 10 may utilize an OBIA model to classify products produced through one or more operations of the industrial automation system 10. Rather than retraining the entire OBIA model, the local control system 44 may modify a portion (e.g., one or more property layers) of the OBIA model associated with the unexpected classification, such as a property layer using segmentation algorithms to identify a feature of the product represented by the image. In this way, an OBIA model may be modified incrementally, thereby improving the efficiency at which the OBIA model is generated.

Figure 4:
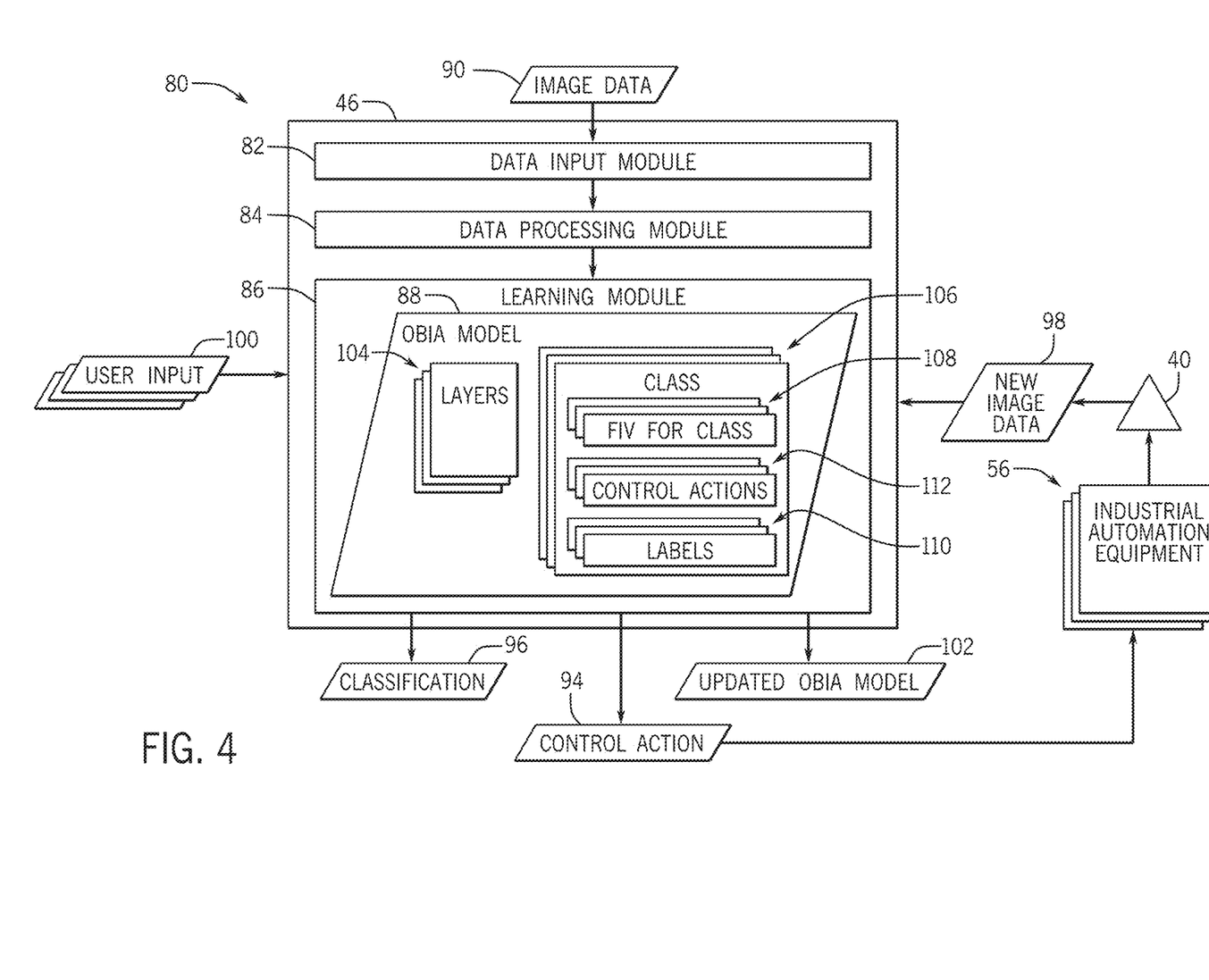
FIG. 4 is a data flow diagram representative of a process performed by the control system of FIG. 3 to generate an object-based image analysis (OBIA) that may be used to control operation of the industrial automation system, in accordance with an embodiment.

For example, FIG. 4 illustrates a block diagram 80 of the control/monitoring device 46 that may include a data input module 82, a data processing module 84, and a learning module 86 that may be used to generate an object-based image analysis (OBIA) model 88 based on image data 90 acquired by cameras or image sensors (e.g., an imaging device 40) disposed around the industrial automation system 10. The OBIA model 88 may generate an output, such as a control action 94 or a classification output 96 (e.g., indicating a condition or anomaly), which may be used to control the industrial automation equipment 56. The control/monitoring device 46 may operating in accordance with the control action 94 and/classification output 96. This may, in turn, cause the industrial automation system 10 to modify its operation. As such, the imaging device 92 may acquire new image data 98 subsequent to the industrial automation equipment 56. The new image data 98 may be provided as input to the OBIA model 88 and the control/monitoring device 46 may modify the OBIA model 88 based on the new image data 98 and user input 100 and, in turn, generate an updated OBIA model 102, as discussed in more detail below.

As shown in the depicted embodiment, the data input module 82 receives the image data 90. In some embodiments, the data input module 82 may receive the image data 90 during operation of the industrial automation system 10 thereby enabling the data input module to generate the OBIA model 88 and/or the updated OBIA model 102 in real-time.

The data input module 82 may be communicatively coupled to the data processing module 84. In general, the data input module 82 may output the received image data 90 to the data processing module 84 and the data processing module 84 may generally pre-process the received image data 90. For example, pre-processing the received image data 90 may include performing image validation, such as determining whether the image data 90 has a minimum quality (e.g., resolution, contrast, amount of memory, noise, sharpness, color, and the like). In some embodiments, the data processing module 84 may generate new features out of the image data 90, such as by generating one or more labels for the image data 90. For example, the data processing module 84 may feed the image data 90 to a previously trained OBIA model. As such, the previously trained OBIA model may identify features within the image data 90 and assign labels to the features. In general, the labels may indicate features in the image data that are associated with conditions of industrial automation equipment or devices 56 in view of the imaging device 40.

In some embodiments, the data processing module 84 may selectively output image data based on a discrepancy between the image data and previous image data. For example, the data processing module 84 may determine whether a discrepancy between the image data 90 and one or more previous image data (e.g., a reference image data) exceeds a threshold. If the data processing module 84 determines that a discrepancy between the image data 90 and a previous image data 90 is above, below, or outside of a threshold or threshold range, the data processing module 84 may output a notification to a user indicating a magnitude of the discrepancy (e.g., outside one or more thresholds) and/or request that the user provide input. For example, the notification may include one or more selectable features (e.g., buttons) displayed via the user's computing device that the user may select to validate or confirm that the property layer should be trained.

In some embodiments, the data processing module 84 may apply cues (e.g., visual cues such as color coding) to the image data that may inform that a user about magnitude of the discrepancy. In an embodiment where the data processing module 84 is operating in conjunction with a module implementing a model, the cues may indicate whether certain portions (e.g., layers, property layers) of the model should receive additional training. That is, in an embodiment where the model classifies the received image data or identifies a condition associated with industrial automation equipment 56 based on the image data, the cues may indicate whether a current version of a model (e.g., the OBIA model 88) is sufficient for characterizing the image data, as generally described in more detail with respect to FIG. 5. For example, the data processing module 84 may determine one or more features of the image data 90, and then determine a degree of match (e.g., a scalar product, a projection and the like) between feature importance vectors (FIVs) of a class of images associated with the model. If the degree of match is below a threshold (e.g., less than 80%, less than 70%, less than 50%), the data processing module 84 may generate a visual cue, such as a tag, with a color or pattern that indicates to a user that the degree of match is below the threshold.

Turning back to FIG. 4, the data processing module 84 is communicatively coupled to the learning module 86. In general, the data processing module 84 may output the pre-processed image data (e.g., the image data 90 pre-processed by the data processing module 84) to the learning module 86, and the learning module 86 may generate, modify, or update an OBIA model 88 using the image data 90, user input 100, and historical image data.

In the depicted embodiment, the OBIA model 88 includes layers 104 (e.g., property layers) and classes 106. In general, the OBIA model 88 receives the image data 90 as input, executes operations associated with each property layer on the image data 90 to identify features of the image data 90, determines an output indicating a class associated with the presence of one or more identified features, and outputs the classification (e.g., indicating the class) and/or control action.

The property layers 104 generally include different operations or algorithms for segmenting the image data 90 and extracting features within the image data 90. For example, a first property layer may include algorithms for clustering different regions of interest in the image data 90 to identify features such as dimensions or a size of an area associated with each region. As another non-limiting example, a second property layer may include algorithms for identifying features such as textures within the regions of the image data 90. As such, the learning module 86 may associate a feature or label indicating that a feature is present in the image data 90 after performing the operations associated with each property layer. The features may be feature importance vectors (FIVs) 108 that generally define a class 106. That is, each class 106 may be defined by one or multiple FIVs that generally indicate features associated with the class 106 and a weighting of each feature towards a particular class 106. Accordingly, the learning module 106 may use the labels 109 and/or FIVs 108 generated using the property layers 104 to classify the image data 90 into a class 106. The class 106 may indicate a condition (e.g., an anomaly, a maintenance condition, and the like) associated with an operation perform by the industrial automation device 56, as discussed in more detail below with reference to FIG. 5.

In some embodiments, the learning module 86 may be capable of providing a visualization of classes and/or a hierarchy of classifications produced by the OBIA model 88 to enable a user to provide input, such as a ranking or voting of features for classes, which may facilitate training on the OBIA model 88, the updated OBIA model 102, and classifications generated by the OBIA model 88 and/or updated OBIA model 102. For example, the learning module 86 may be capable of producing a window display each class and allow the user to select (e.g., click) on a class, and subsequently provide filters and/or feature maps at different property layers of the OBIA model 88 that are ranked (e.g., by the OBIA model 88 or a user) based on their relevance. In some embodiments, a user may be allowed to vote/rank the feature map(s) that a user considers the most pertinent to the identified class. In this way, a user may assess an activeness of a learning algorithm (e.g., a neural network) in pattern learning used to identify features and relationships between classes 106. Further, this may enable a user to assess the learning algorithm's vulnerability in feature space.

In some embodiments, the learning module 86 may generate a class similarity matrix, such as by using a distance criterion between the FIV(s) for each class 106. The class similarity matrix may provide a format for presenting differences or similarities between classes that is intuitive for the operators to interact. For example, in an embodiment where the class similarity matrix is used to present a window or dashboard to inform the user of potential classes associated with an image data 90, classes 106 may be organized relative to a class 106 selected by a user. For example, a user may select a class 106 and the rest of the classes 106 may be organized such that the most similar class is shown closest to the selected class. In some embodiments, the class similar matrix may be augmented with a confidence map. For example, the class similarity matrix may have a gray scale shadow that may indicate a darker gray for higher confidence or a lighter gray for less confidence of differences between classes for the image data 90. The confidence map may inform the user of image capture requirements (e.g., more images are needed when confidence is low). In some embodiments, the learning module 86 may utilize the user input 100 to determine a ranking of features as a guide to incrementally training the OBIA model 88. For example, the user input 100 may indicate particular features to use for determining classes 106. In any case, the learning module 86 may output the OBIA model 88 as an executable (e.g., a containerized application) that may be deployed in different form factors, such as on edge devices, or devices external to the control/monitoring system 44. In general, the containerized application may include a virtualization of the operating system (OS) that runs and modifies the OBIA model. Outputting the OBIA model 88 as part of a containerized application may provide certain benefits such as using less resources than deploying the OBIA model 88 using a virtual machine. At least in some instances, the executable may contain the information used to classify images based on features (e.g., weights, constraints, sensitivities) to allow warm start of a training task for the OBIA model 88 when additional images are made available. In this way, the OBIA model 88 or the updated OBIA model 102 may be flexibly deployed on various edge devices, rather than being deployed on a computing device that may utilize relatively higher processing capabilities.

In some embodiments, the learning module 86 may train the OBIA model 88 using labeled images generated by an additional OBIA model (e.g., a previously trained OBIA model) and user input 100. In general, certain control systems may utilize supervised OBIA models to monitor and/or control industrial processes. However, training the supervised OBIA models may require a relatively large number of example images (e.g., greater than 100, greater than 500, greater than 1000, greater than 5000) to produce an OBIA model that works reliably and consistently. As such, training using example images can be a time-consuming process. Accordingly, it is presently recognized that utilizing an additional OBIA model and user input 100 indicating labels for images processed using the additional OBIA model may reduce the number of example images used to train the OBIA model. In this way, utilizing an additional OBIA model to train the OBIA model 88 may simplify and speed up labeling before any training of the OBIA model 88 thereby improving the efficiency of generating the OBIA model 88.

As an example of the above described process for training the OBIA model 88 using an additional OBIA model, the learning module 86 may receive multiple images (e.g., the image data 90) and provide the multiple images to a previously trained OBIA model capable of identifying features within an image. That is, the previously trained OBIA model may be capable of producing an output including each image and information indicating the features identified in each image. The learning module 86 may receive the output of the previously trained OBIA model (i.e., the images and the identified features) and group images that exhibit similar features, such as by using clustering techniques. The learning module 86 may then provide one or more example images representing each group of the grouped images to computing device such that a user may provide feedback (e.g., user input 100), such as labels for each feature. Accordingly, the OBIA model 88 may be retrained using the newly labeled example images, thereby generating the OBIA model 88, and the unlabeled images may be presented to the OBIA model 88. It should be noted that this process may be repeated multiple times (e.g., until the expert stops labeling new images corresponding to unclassified images). In this way, utilizing the previously trained OBIA model and the user input 100 to retrain the previously trained OBIA model may improve the efficiency of training the OBIA model 88 by reducing the number of example images to be reviewed by a user during a supervised training process of the OBIA model 88.

At least in some instances, the control/monitoring device 46 (e.g., the data input module 82, the data processing module 84, and the learning module 86) may modify the OBIA model 88 after the OBIA model 88 is implemented to control the industrial automation system 10. As shown, the learning module 86 outputs a control action 94 and/or a classification 96 using the OBIA model 88 to the industrial automation equipment 50. In this way, the control/monitoring device 46 may utilize the OBIA model 88 to generate control signals and/or perform actions to control the operation of the industrial automation system 10.

Accordingly, the industrial automation equipment 50 may operate in accordance with the control action 94 and/or the classification 96. The imaging device 92 may acquire new image data 98 after the industrial automation equipment 50 implements the control action 94, for example. In general, the new image data 98 may indicate a change in a state of the industrial automation equipment 50 or a product being produced or modified by the industrial automation equipment 50. The control/monitoring device 46 or other suitable device may determine whether the change in the state exceeds a threshold. If the change in the state of the industrial automation equipment 50 does not exceed a threshold (e.g., indicating that an anomaly was not corrected), the control/monitoring device 46 may output a notification to a user, requesting that the user provide user input, such as whether the classification 96 and/or control action 94 is an incorrect classification or incorrect control action.

If there is an indication (e.g., user input 100 received by the control/monitoring device 46) that the classification associated with the new image data 98 is an incorrect or unexpected classification, the control/monitoring device 46 or suitable computing device may identify one or more property layers associated with the identified feature that result in the classification 96, and retrain a portion of the OBIA model 88 associated with the identified property layers 104. In this way, the OBIA model 88 may receive feedback (e.g., via the new image data 98 and the user input 100) that enables incremental adjustments to the OBIA model 88 to generate an updated OBIA model 92. That is, by retraining the property layers 104 associated with the classification 96 and/or control action 94 that was determined to be incorrect, less memory is used for retraining the OBIA model 88. Accordingly, the OBIA model 88 may be modified or retrained via an edge device, rather than using the control/monitoring device 46, thereby freeing resources that may be used by the control/monitoring device 46 for other operations.

In some embodiments, the OBIA model 88 may be retrained using one or more images that represent a combination of particular features vectors that indicate a class. That is, after the control/monitoring device 46 determines that a condition was incorrectly classified as belonging to "class A," the control/monitoring device 46 may request that the user provide one or more images representing an expected class A, such as a labeled image where the labels indicate features indicative of the class A. After receiving the labeled image, the control/monitoring device 46 may provide the labeled image as input to the OBIA model 88 and identify property layers that output unexpected or incorrect FIVs as compared to the labels of the labeled image. That is, the OBIA model 88 may be used to generate activation levels at each property layer that represent an accuracy of the label output by the property layer compared to the expected label. In some embodiments, the control/monitoring device 46 may determine to retrain property layers having an accuracy below a threshold (e.g., below 95%, below 90%, below 75%, below 50%).

As one non-limiting example, in an embodiment where the OBIA model 88 is a neural network, the OBIA model 88 may utilize an activation maximization protocol, whereby an image that is approximately an "ideal representation" of a class is provided to the OBIA model 88. That is, the "ideal representation" includes features that the OBIA model 88 would be expected to label as the features associated with "class A." Accordingly, the OBIA model receives the "ideal representation" and outputs labels indicating the features of the "ideal representation." As described above, each labeled feature may be the result of one or more property layers. As such, if there is a discrepancy between a label output by the OBIA model and an expected label of the "ideal representation" (e.g., provided by a user) then the control/monitoring device 46 may determine that the property layer that output the incorrect label should be retrained.

In some embodiments, the property layers of the OBIA model 88 may be retrained based on a confidence interval associated with features (e.g., FIVs) being below a threshold. For example, as generally discussed herein, the OBIA model may include multiple property layers each associated with features used to classify an image. Each feature resulting from a property layer may include a confidence interval indicating a likelihood of the identified feature being a correctly identified feature. As such, if a confidence level for an identified feature is below a threshold, that property layer may be indicated in the notification sent to the user and/or retrained.

In some embodiments, the OBIA model 88 and/or the updated OBIA model 102 may be stored on the memory 68 of the control/monitoring device 46. In some embodiments, the OBIA model may be deployed at the edge, on a server, or in a cloud (e.g., cloud-based computing system 62). In any case, the user input 100, may be received via a PLC program in a controller or via an interface on an HMI or web application. Additionally, the updated OBIA model 102 (e.g., modified based on the user input 100) may be stored or delegated to a server, a cloud resource, or an edge device. For example, the updated OBIA model may be downloadable to the edge device or an industrial automation system 10.

Figure 5:
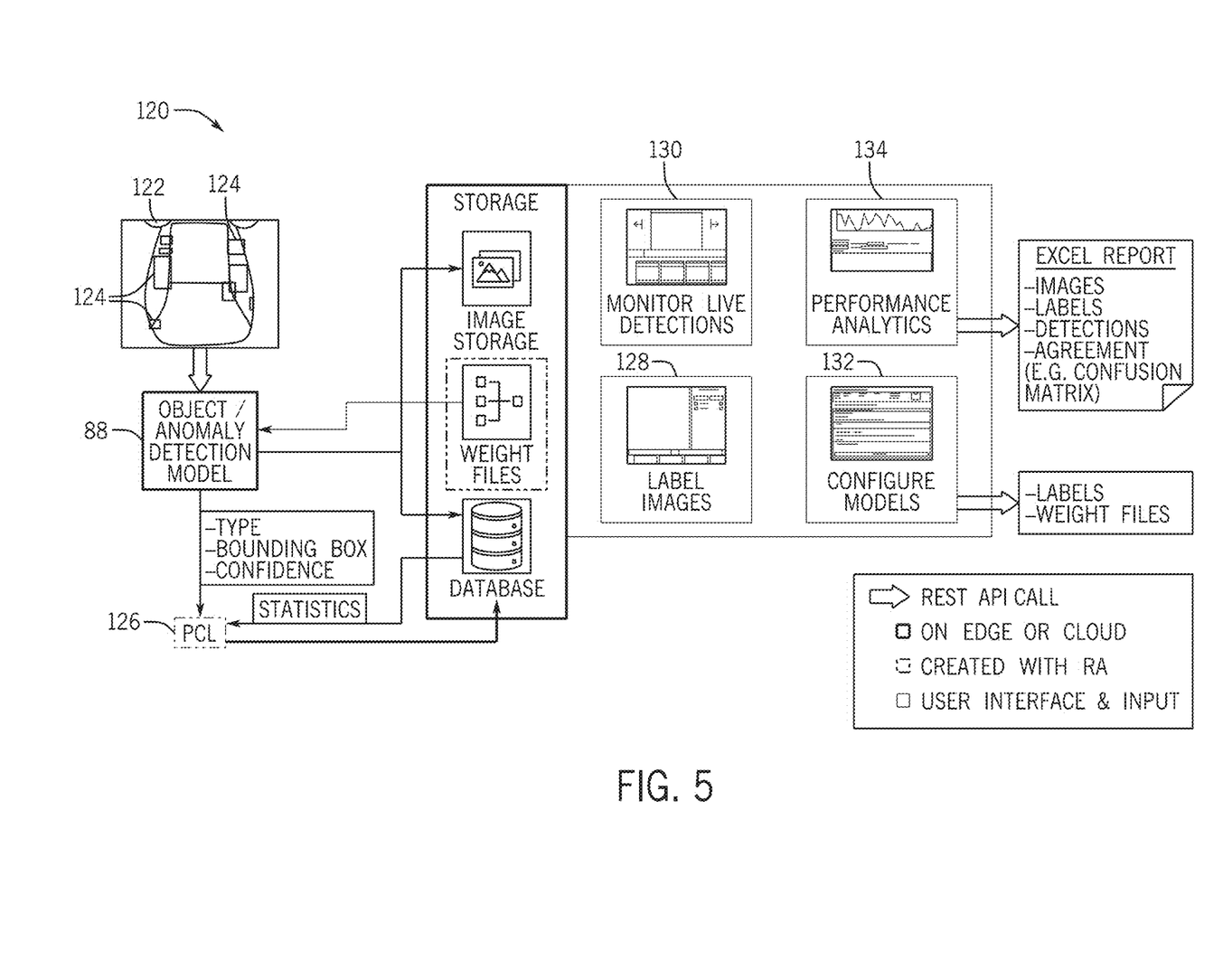
FIG. 5 is a data flow diagram representative of a process performed by the control system of FIG. 3 implementing the techniques of FIG. 4, in accordance with an embodiment.

To illustrate a non-limiting implementation of the OBIA model, FIG. 5 illustrates a flow diagram 120 of an OBIA model 88 used to identify a quality of a chair produced by chair manufacturing automation system, which may include similar components as described above with regard to the industrial automation system 10.

Referring to FIG. 5, labeled image 122 (e.g., an image labeled by the data processing module 84 or generated as an output of the OBIA model 88) depicts an aerial view of a seat cover disposed on a chair. In the depicted embodiment, the labeled image 122 includes features that are indicated or labeled with areas 124. The areas 124 indicate regions of the seat cover that have an identified texture, which may correspond to wrinkles in the specific implementation. The labeled image 122 is provided as input to the OBIA model 88 that, in turn, outputs a control signal (e.g., to the PLC 126), which may cause a machine (e.g., an industrial automation equipment 56) to smooth out the seat cover at the locations associated with the identified areas 124 to remove the wrinkles from the seat cover.

In some embodiments, a computing device (e.g., the control monitoring device 46) may output a notification to a computing device associated with a user in response to identifying the areas 124 or classifying the areas 124 as having wrinkles. For example, the control/monitoring device 46 may output the notification before outputting the control signal. As such, a user may determine whether or not a control action 94 should be performed. The notification generally displays information, whether in a dashboard, a graphical user interface (GUI), window, or otherwise, that facilitates the user monitoring the industrial automation system 10, such as whether the OBIA model 88 is generating expected outputs (e.g., classifications 96 or control actions 94) based on the image data. In some embodiments, the notification may include an image 128 (e.g., the labeled image 122 without the labels) to enable the user to manually label regions of the image 128. Additionally or alternatively, the notification may include a live video feed 130 to enable the user to monitor certain operations, such as whether the machine addressed the identified wrinkles. Additionally or alternatively, the notification may display an interface 132 to enable the user to configure the model, such as by setting weights for certain FIVs (e.g., FIV 108) for a given class or weights for certain files to use to train, modify, or update the OBIA model 88. In some embodiments, the notification may display performance analytics 134, which may facilitate the user in determining how accurately the OBIA model 88 is making decisions based on confidence intervals associated with the classes used to classify images.

In any case, upon receiving an input (e.g., user input) from the computing device indicating the condition output by the OBIA model 88 is unexpected or incorrect, the computing device may receive an indication of the property layers 124 of the OBIA model 88 to be retrained. The computing device may receive training data from the user, such as one or more images labeled with an expected condition, which may facilitate retraining of the OBIA model 88.

Figure 6:
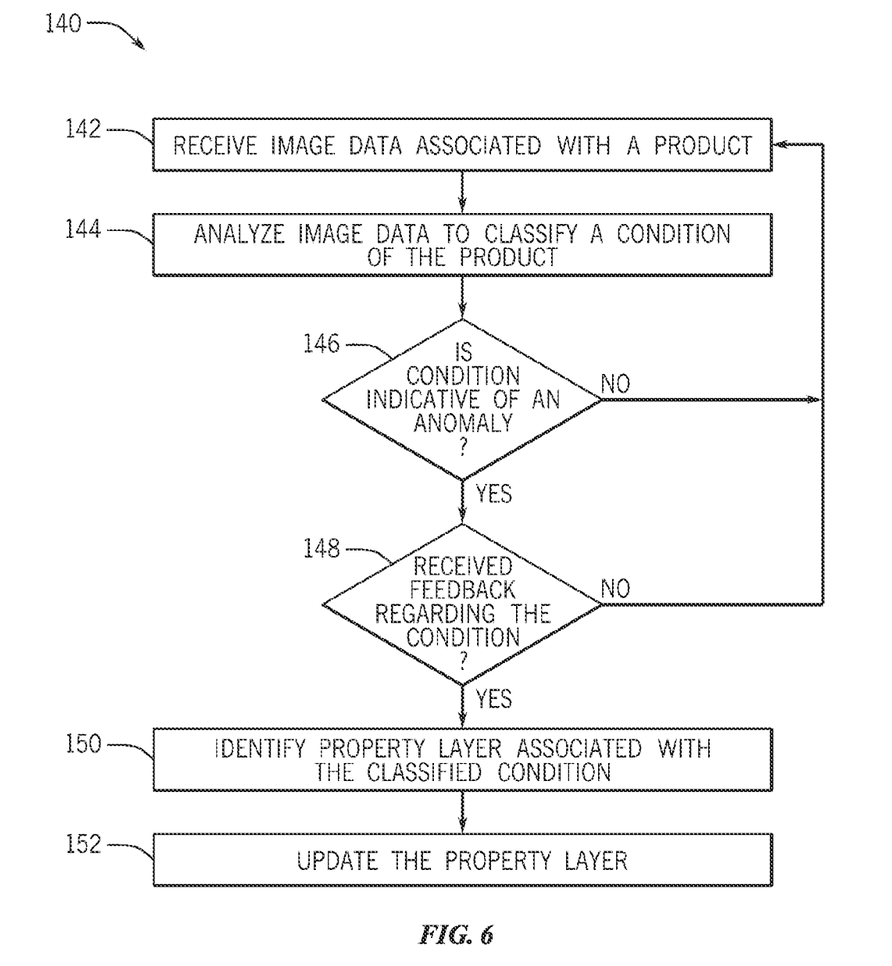
FIG. 6 illustrates a flow chart of a method for modifying an OBIA model based on unexpected classifications, in accordance with an embodiment.

As described herein, a portion of the OBIA model 88 may be retrained based on a user input indicating that a previous output (e.g., a condition) of the OBIA model 88 was incorrected. More specifically, the portion of the OBIA model 88 that is retrained is one or more properly layers that segment image data (e.g., image data 90) and result in a FIV that deviates from an expected FIV. It should be noted that by retraining a portion of the OBIA model 88, rather than the whole OBIA model 88, the retraining may be performed on edge devices have relatively lower processing capabilities than a computing device used to generate the OBIA model 88. Moreover, the retraining of the portion of the OBIA model 88 may enable the computing device that performs the retraining to use fewer computing resources (e.g., processing power, memory, storage) than those that retrain the entire model or those that modify operations based on detected discrepancies. To illustrate this, FIG. 6 illustrates a flow chart of a method 140 for incrementally modifying or retraining an OBIA model 88. Although the method 140 described as being performed by the control/monitoring device 46, it should be noted that any suitable computer device capable of communicating with other components in the industrial automation system 10 may perform the disclosed method 140 including, but not limited to, the cloud-based computing system 62, the computing device 60, and the like.

With this in mind, and referring now to FIG. 6, at block 142, the control/monitoring device 46 may receive image data of a product produced, repaired, modified, or assembled by the industrial automation system 10. In general, the image data may be an image depicting operations performed by one or more industrial automation devices of the industrial automation system 10. For example, in an embodiment where the disclosed techniques are used in an automotive assembly line, the image may depict a car seat after a car seat cover has been applied to the car seat frame. As another non-limiting example, the image may depict batter deposited on a tray.

At block 144, the control/monitoring device 46 may analyze the image data to classify a condition of the product. In general, control/monitoring device 46 may provide the image data as input to an OBIA model. As discussed herein, the OBIA model generally utilizes one or more property layers to identify properties of the product and classifies the condition of the product based on the properties. Continuing with the example of the car seat above, a first property layer of the model may segment the image data to identify textures in the image data, which may be indicative of whether a correct seat cover was applied to a car seat frame, or whether the seat cover was applied properly.

At block 146, the control/monitoring device 46 may determine whether the condition is indicative of an anomaly in the product. Continuing with the example above, the control/monitoring device 46 may determine that the texture is associated with an anomaly, such as the car seat being applied incorrectly. In some embodiments, the control/monitoring device 46 may output a control signal to an industrial automation device, such as a robot, that causes the robot to smooth the applied car seat and remedy the anomaly. In such embodiments, the process 140 may repeat at block 142 may contain the information (weights, constraints, sensitivities) to allow warm start of the training task when additional images are made available and receive an image data associated with the car seat cover after being smoothed and the control/monitoring device 46 may proceed with steps 142 and 144 to determine whether the control signal to the robot remedied the identified anomaly. Additionally, the process 140 may proceed to block 148. However, if the control/monitoring device 46 determines that the condition is not indicative of an anomaly, the process 140 may also return to step 142 for a subsequent image.

At block 148, the control/monitoring device 46 may output a notification to a computing device associated with a user. For example, the notification may be alert and/or provide information associated with the anomaly, such as the identified condition. In any case, the user may provide an input indicating whether the anomaly was correctly classified by the OBIA model 88. As such, the notification may also request that the user provide activation images associated with the class to facilitate identifying one or more property layers to be retrained, as discussed below.

At block 150, the control/monitoring device 46 may identify a property layer associated with the classified condition. In general, the control/monitoring device 46 may identify at least one property layer using an activation image as described above with respect to the learning module 86 of FIG. 4.

After identifying the property layer, the control/monitoring device 46, at block 152, may update the property layer. In general, updating the OBIA model 88 may include retraining at least the identified property layer using one or more images provided by a user, such as an activation image. In some embodiments, the control/monitoring device 46 may request that the user provide one or more images to facilitate retraining of the identified property layer. That is, the control/monitoring device 46 may send an additional notification (e.g., after sending the notification sent at block 148) that indicates the identified property layer. For example, the notification may indicate a FIV associated with the property layer and request that the user provide example images of the FIV. After updating the OBIA model 88, the updated OBIA model 102 may be stored or output as a containerized application, as generally described above with respect to FIG. 4.

Accordingly, the present disclosure relates to retraining a portion of an OBIA model 88 based on an unexpected or incorrect classification of a condition associated with a product. In general, a processor may identify the portion of the OBIA model 88 to retrain by determining a property layer of the OBIA model 88 associated with the incorrect classification. For example, the OBIA model 88 may receive the activation image as input and output feature importance vectors associated with property layers of the OBIA model 88. In turn, the processor may determine a discrepancy between the output feature importance vectors and actual feature importance vectors of the activation image, and thus retrain the property layers that output the feature importance vectors having a discrepancy above a threshold. In this way, a portion of the OBIA model 88 is retrained, rather than retraining the entire OBIA model. In this way, retraining of the OBIA model may utilize less resources, and thus the OBIA model may be efficiently implemented and modified into an industrial automation system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein

The invention claimed is:

1. A non-transitory computer-readable medium comprising computer-executable instructions that, when executed, are configured to cause a processor to perform operations comprising:
    receiving image data after one or more operations are performed by one or more industrial automation devices on a product;

analyzing the image data based an object-based image analysis (OBIA) model to classify the product as one of a plurality of conditions related to manufacturing quality, wherein the OBIA model comprises one or more property layers associated with one or more features related to a manufacturing of the product;

determining whether the one of the plurality of conditions is indicative of an anomaly being present in the product;

sending a notification to a computing device, wherein the notification is indicative of the one of the plurality of conditions is presently associated with the product;

identifying at least one property layer of the one or more property layers of the OBIA model associated with classifying the one of the plurality of conditions in response to receiving a first input indicative of the anomaly being incorrectly associated with the product;

updating the OBIA model based on the at least one property layer of the one or more property layers and the first input indicative of the anomaly being incorrectly associated with the product;

determining one or more adjustments to the one or more operations in response to receiving a second input indicative of the anomaly being correctly associated with the product; and sending one or more control signals to the one or more industrial automation devices based on the one or more adjustments.

2. The non-transitory computer-readable medium of claim 1, wherein the one or more property layers are one or more digital image processing techniques associated with at least one condition of the plurality of conditions, wherein the digital image processing techniques comprise image segmentation, object recognition, or both.

3. The non-transitory computer-readable medium of claim 1, wherein the computer-executable instructions that, when executed, are configured to cause the processor to perform the operations comprising updating the OBIA model by retraining the OBIA model based on the one property layer of the one or more property layers.

4. The non-transitory computer-readable medium of claim 1, wherein the plurality of conditions comprise a defect of a portion of the product.

5. The non-transitory computer-readable medium of claim 1, wherein the operations comprise:
receiving subsequent image data at a time subsequent to outputting one or more control signal to the one or more industrial automation devices; and
determining whether the one of the plurality of conditions is indicative of the anomaly being present in the product based on the subsequent image data.

6. The non-transitory computer-readable medium of claim 1, wherein the OBIA model is stored on an edge computing device communicatively accessible to the processor.

7. A method, comprising:
receiving, via a processor, image data after one or more operations are performed by one or more industrial automation devices on a product;
analyzing, via the processor, the image data based an object-based image analysis (OBIA) model to classify the product as one of a plurality of conditions related to manufacturing quality, wherein the OBIA model comprises one or more property layers associated with one or more features related to a manufacturing of the product;

determining, via the processor, whether the one of the plurality of conditions is indicative of an anomaly being present in the product;

sending, via the processor, a notification to a computing device, wherein the notification is indicative of the one of the plurality of conditions is presently associated with the product;

receiving, via the processor, an activation image, as an input to the OBIA model, having a plurality of labeled features;

determining, via the processor, that the OBIA model improperly labels a labeled feature of the plurality of labeled features;

identifying, via the processor, at least one property layer of the one or more property layers of the OBIA model associated with classifying the one of the plurality of conditions in response to determining that the OBIA model improperly labels the labeled feature; and updating, via the processor, the OBIA model based on the at least one property layer of the one or more property layers.

8. The method of claim 7, comprising exporting the updated OBIA model as a containerized application.

9. The method of claim 7, comprising determining a confidence interval associated with a feature of the one or more features; and
identifying the at least one property layer based on the confidence interval being below a threshold.

10. The method of claim 7, wherein the OBIA model comprises a first ranking of feature vectors associated with the one of the plurality of property layers, and wherein updating the OBIA model comprises determining a second ranking of feature vectors based on a received input.

11. The method of claim 7, wherein the OBIA model is retrieved from an edge computing device.

12. The method of claim 7, wherein the one or more property layers are one or more image segmentation techniques associated with at least one condition of the plurality of conditions, wherein the digital image processing techniques comprise image segmentation, object recognition, or both.

13. A non-transitory computer-readable medium comprising computer-executable instructions that, when executed, are configured to cause a processor to perform operations comprising:
receiving image data after one or more operations are performed by one or more industrial automation devices on a product;
analyzing the image data based an object-based image analysis (OBIA) model to classify the product as one of a plurality of conditions related to manufacturing quality, wherein the OBIA model comprises one or more property layers associated with one or more features related to a manufacturing of the product;
determining whether the one of the plurality of conditions is indicative of an anomaly being present in the product;
sending a notification to a computing device, wherein the notification is indicative of the one of the plurality of conditions is presently associated with the product;
receiving, as an input to the OBIA model, an activation image having a plurality of labeled features;
determining that the OBIA model improperly labels a labeled feature of the plurality of labeled features;
identifying at least one property layer of the one or more property layers of the OBIA model associated with classifying the one of the plurality of conditions in response to-determining that the OBIA model improperly labels the labeled feature; and updating the OBIA model based on the at least one property layer of the one or more property layers and the input indicative of the anomaly being incorrectly associated with the product.

14. The non-transitory computer-readable medium of claim 13, wherein the computer-executable instructions that, when executed, are configured to cause the processor to determine that the OBIA model improperly labels the labeled feature.

15. The non-transitory computer-readable medium of claim 13, wherein the computer-executable instructions that, when executed, are configured to cause the processor to output the updated OBIA model as a containerized application.

16. The non-transitory computer-readable medium of claim 13, wherein the computer-executable instructions that, when executed, are configured to cause the processor to output a notification indicative of the updated OBIA model.

17. The non-transitory computer-readable medium of claim 16, wherein the OBIA model is retrieved from an edge computing device communicatively accessible to the processor.

* * * * *